Jan. 8, 1924.   
A. BEHNKE ET AL  
1,480,492  
PULSATOR FOR MILKING MACHINES  
Filed July 22, 1922   2 Sheets-Sheet 1
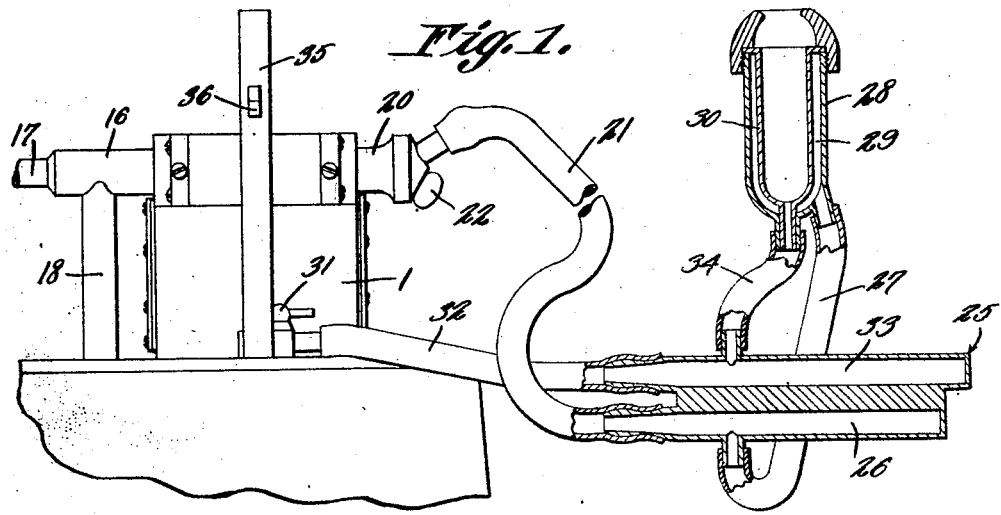
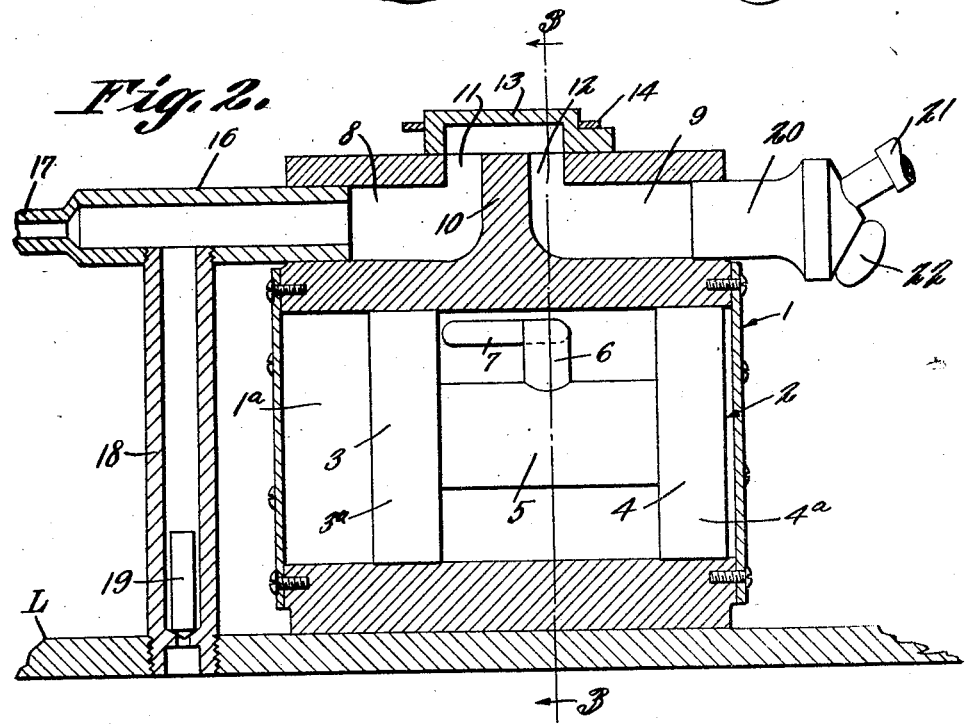
Inventors,
A. Behnke
J. C. Jenson.
By C. A. Snow & Co.
Attorneys.

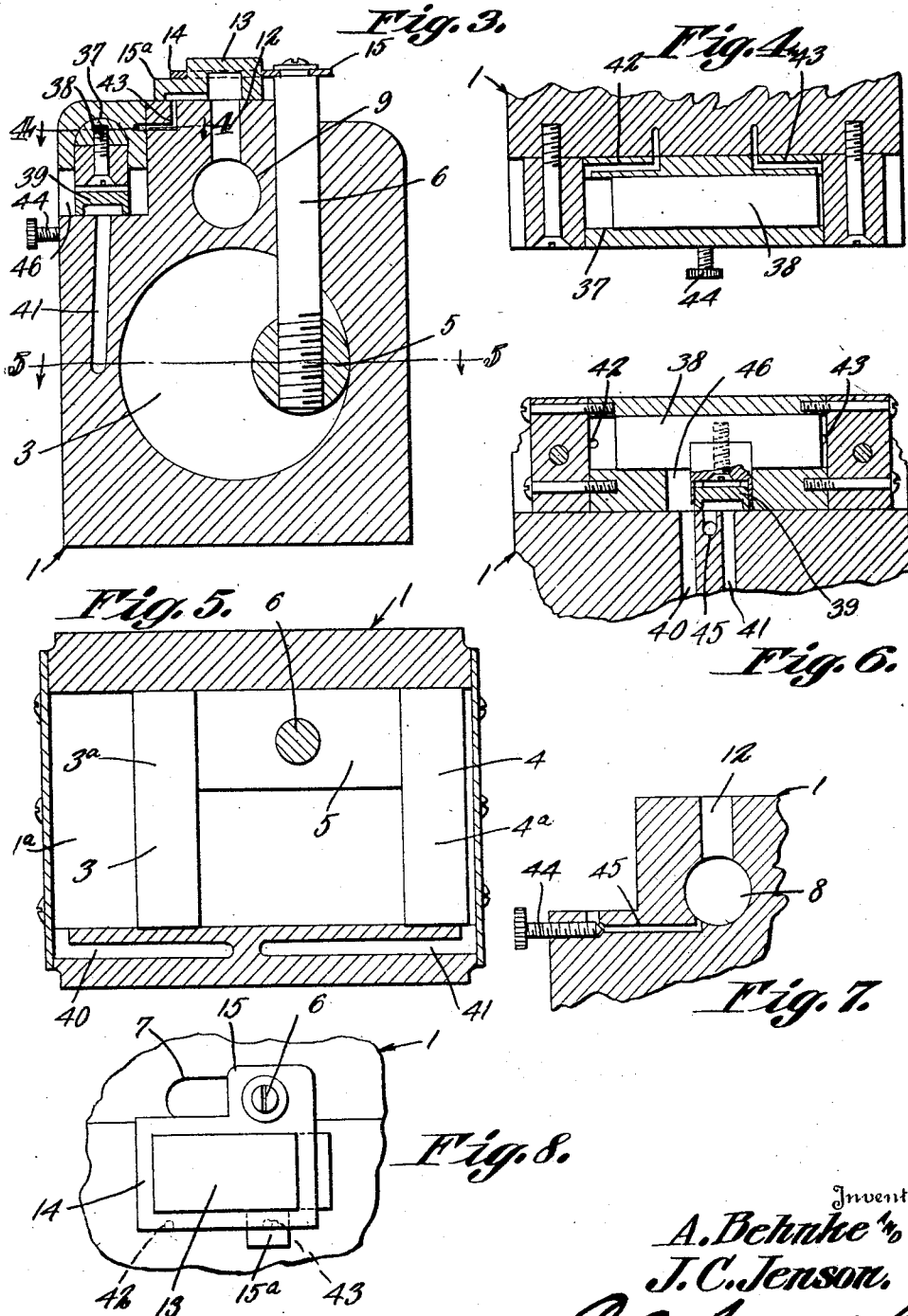

Patented Jan. 8, 1924.

1,480,492

UNITED STATES PATENT OFFICE.

ARTHUR BEHNKE AND JENS C. JENSON, OF ROYALTON, WISCONSIN.

PULSATOR FOR MILKING MACHINES.

Application filed July 22, 1922. Serial No. 576,740.

*To all whom it may concern:*

Be it known that we, ARTHUR BEHNKE and JENS C. JENSON, citizens of the United States, residing at Royalton, in the county of Waupaca and State of Wisconsin, have invented a new and useful Pulsator for Milking Machines, of which the following is a specification.

This invention relates to milking machines and more particularly to pulsators for use in connection therewith.

The object of the invention is to provide simple and efficient means for distributing the unthrottled vacuum to the operating piston.

Another object is to provide a pulsator employing single pistons, the vacuum to one of which is direct, unthrottled vacuum being used on the piston which alternates the valve for vacuum on another piston.

With the foregoing and other objects in view which will appear as the description proceeds, the invention resides in the combination and arrangement of parts and in the details of construction hereinafter described and claimed, it being understood that changes in the precise embodiment of the invention herein dislosed may be made within the scope of what is claimed without departing from the spirit of the invention.

In the accompanying drawings:—

Figure 1 represents a side elevation of a portion of a milk pail with this improved pulsator mounted on the lid thereof, parts being broken out and in section.

Fig. 2 is an enlarged longitudinal section.

Fig. 3 is a transverse section taken on the line 3—3 of Fig. 2.

Fig. 4 is a detail sectional view taken on the line 4—4 of Fig. 3.

Fig. 5 is a horizontal section taken on the line 5—5 of Fig. 3.

Fig. 6 is a detail vertical section.

Fig. 7 is a detail sectional view, and

Fig. 8 is a detail plan view.

In the embodiment illustrated, a milk pail lid or cover L is shown on which the pulsator constituting this invention is mounted and which is designed to have an air tight connection with the pail so that a vacuum may be established in the pail to draw the milk thereinto.

A housing 1 is mounted on the lid L and has a cylinder 1ª in which a large piston 2 is mounted to reciprocate, the heads 3 and 4 thereof being connected by a rod 5 from which a stem 6 extends upwardly at right angles through an elongated opening 7 in the housing. The heads 3 and 4 are equipped with packing 3ª and 4ª to provide a fluid tight connection between the piston and the cylinder walls.

The housing 1 which is preferably made in the form of a casting, has two longitudinally alined bores 8 and 9 arranged in the top thereof parallel with the cylinder in which the piston 2 operates. These bores 8 and 9 are separated by a transverse partition 10 adjacent which are two openings 11 and 12 which lead from the bores 8 and 9 to the atmosphere.

A hollow sliding valve 13 is mounted to reciprocate over said openings 11 and 12 to connect them at intervals and to alternately uncover opening 12 so that atmospheric air may be admitted to the bore 9 through said opening to effect the proper pulsating action in a manner presently to be described.

A frame 14 surrounds the valve 13 and has a lateral extension 15 from one side edge near one end of the frame 1 to which the upper end of the stem 6 is secured, see Figs. 3 and 8. This valve 13 also has a lateral extension 15ª on the edge opposite that on which the extension 15 is mounted and which is designed for a purpose presently to be described.

The valve 13 is made hollow as shown in Fig. 2 so that when in the position shown in said figure, the bores 8 and 9 will communicate with each other through said valve which straddles partition 10 when so located, and connects openings 11 and 12 this being desirable to provide for the application of the vacuum through bores 8 and 9 to the teat cups, one which is shown in Fig. 1.

A nipple 16 is inserted in bore 8 and is connected by a rubber hose 17 with a stall cock on a vacuum line, not shown. A pipe 18 connects nipple 16 with the pail. A check valve 19 in pipe 18 operates to maintain the vacuum in the pail.

A forked nipple 20 is inserted in bore 9 and is designed for connection with a hose 21 leading to a claw 25. This nipple 20 is only forked when the pulsator is to be used for milking two cows simultaneously. When one cow only is to be milked, a plug or stopper 22 is inserted in one branch of the nipple, see Fig. 1.

The claw 25 has a chamber 26 with which the hose 21 is connected from which a short hose 27 leads to a chamber 29 formed between the teat cup shell 28 and a teat gripping member 30. One of these teat shells only is shown, but of course it is to be understood that four are used in connection with each claw.

A valve 31 in the lid L is connected by a hose 32 with a chamber 33 of claw 25 and through a hose 34 leading from said chamber 33 to the interior of the teat cup 30 applies a vacuum or suction to the teat and also operates as a conduit for conducting the milk drawn from the teat to the pail.

The lid L has a bail-shaped handle 35 provided with a hook 36 on which to hang claw 25 and the teat cups when not in use.

The casting 1 also has a bore 37 in which a small piston 38 reciprocates and which actuates a slide valve 39. This valve 39 alternates the vacuum and atmospheric pressure to operate piston 2 in a manner to be described.

Conduits 42 and 43 open into the opposite ends of the bore 37 and to the atmosphere and are controlled by the extension 15ª of the valve 13, said extension operating to alternately cover and uncover the respective conduits which open through the casting adjacent the openings 11 and 12 and which are controlled by the reciprocation of said valve 13.

The extension 15ª of valve 13 is hollow and communicates with the interior of valve 13 and through conduits 42 and 43 connects opening 11 and the vacuum supply bore 8 with the cylinder or bore 37, alternately supplying vacuum to the ends of said cylinder to reciprocate piston 38 through valve 39 which piston actuates and controls piston 2.

Ports 40 and 41 lead from a chamber 46 which is open to the atmosphere and in which valve 39 reciprocates, to the respective ends of the cylinder 1ª as is shown clearly in Fig. 5. These ports are alternately covered and uncovered by valve 39 which also overlies the discharge end of a conduit 45 leading from bore 8 and by means of which vacuum is alternately supplied from conduit 45 to the respective ends of cylinder 1ª.

A regulating screw or throttle valve 44 operates in conduit 45 which leads from bore 8 to a point under valve 39 between the terminals of ports 40 and 41 and said screw regulates the vacuum supplied to piston 2 and controls the speed of said piston 2 which produces the pulsations in the teat cups without affecting the movement of valve 39 so that ample power for operating said valve is afforded without the use of any springs or snap-offs.

In the use of this apparatus, the nipple 16 being connected with the stall cock of the vacuum pipe line or other vacuum producing means, and the nipple 20 with the hose 21 leading to the teat cups, the pulsator is operated as follows:—

The slide valve 13 being at the limit of its rearward stroke or its stroke towards the right, as shown in Figs. 2 and 8, suction is established in the teat shell 28 through bore 8, openings 11 and 12, bore 9, tube 21, and pipe 27, and the hollow branch or extension 15ª of valve 13 will overlie the terminal of conduit 43 and thus vacuum in the left end of bore 37 will be produced while the other end of said bore will be open to the atmosphere through conduit 43, the outer end of which is uncovered when valve 13 is in this position. The vacuum so produced in said bore 37 and the atmospheric pressure in the right end of said bore will operate to move piston 38 and the valve 39 controlled thereby to the left and thus bring conduit 40 into communication with conduit 45 and admit vacuum to the left end of cylinder 1ª. This connection of conduit 40 with conduit 45 will uncover the outer end of conduit 41 thereby admitting atmospheric pressure to the right end of cylinder 1ª. This admission of vacuum and atmospheric pressure to the cylinder 1ª will operate to reciprocate piston 2 to the left and thereby through its connection with valve 13 shift said valve to the left which uncovers bore 9 bringing it into communication with the atmosphere and breaking the vacuum in the teat cups and simultaneously through the branch 15ª supplies vacuum through conduit 42 to the right end of bore 37 and reciprocates valve 39 to the right bringing port 41 into communication with bore 8 for admitting vacuum to the right end of cylinder 1ª to reciprocate the piston 2 toward the right.

It will thus be seen that when the vacuum is turned on into bore 8, the piston 2 will be reciprocated to control the pulsations of the teat cups and also the actuation of valve 39 controls the supply of vacuum for actuating piston 2 without in any way interfering with the operation of valve 13.

By adjusting the set screw 44 the amount of vacuum supplied to the cylinder 1ª may be regulated and consequently the speed of the pulsator controlled without in any way affecting the vacuum supplied for operating piston 38 which controls valve 39 so that ample power for operating the valve 39 will be afforded and no springs or other mechanical contrivances required to effect such operation.

We claim:—

1. A pulsator including single, independent, pistons, means for supplying vacuum direct to one of said pistons, a reciprocatory valve controlling the vacuum supply to the other piston, means for regulating the vacuum supplied to said second mentioned piston for controlling the speed of said piston, the direct vacuum operated piston being connected to alternate said valve, and means controlled by said second mentioned piston for controlling the pulsations in the teat cups without affecting the movement of said reciprocatory valve.

2. In a pulsator, a casing having a pair of cylinders, pistons mounted to reciprocate in said cylinders, a conduit for connection with vacuum mechanism, another conduit for connection with a teat cup mechanism, said conduits having ports leading therefrom, a hollow valve slidable over said ports for intermittently connecting them and alternately exposing one of them to permit atmospheric pressure to enter said port, a connection between said valve and the piston on one of said cylinders, a hollow extension leading from said valve and communicating therewith, conduits leading to the other cylinder and opening thereinto at opposite ends thereof, said valve extension being mounted to alternately connect said conduit with a vacuum supply and with the atmosphere, conduits located between said pistons, and means whereby the vacuum actuating valve connected piston is controlled by the other piston.

3. A pulsator comprising a casting having a cylinder bored therein and closed at its opposite ends, a piston reciprocable therein with a stem extending radially therefrom through the casting, longitudinally alined bores in the casting parallel with said cylinder and having laterally extending openings leading therefrom at their inner ends, a vacuum pipe connected with the outer end of one bore and a nipple in the outer end of the other bore for connection with the claw hose, a hollow valve slidable over said bore opening to alternately bring them into and out of communication, said valve having a hollow lateral extension, said valve being connected with said stem, whereby the valve is operated by said piston, another cylinder having a piston reciprocable therein, conduits leading from the ends of said cylinder to a point under the valve and adapted to be alternately uncovered by said valve extension.

4. In a pulsator, a casing having a pair of parallel cylinders with pistons mounted to reciprocate in said cylinders, a stem projecting from one of said cylinders through said casing, a conduit for connection with vacuum mechanism, another conduit for connection with a teat cup mechanism, said conduits having ports leading therefrom, a hollow valve slidable over said ports for intermittently connecting them and alternately exposing one of them to permit atmospheric pressure to enter said port, said valve being attached to said piston stem, a hollow extension leading from said valve and communicating therewith, conduits leading to the other cylinder and opening thereinto at opposite ends thereof, said valve extension being mounted to alternately connect said conduit with a vacuum supply and with the atmosphere, conduits located between said pistons, and means whereby the vacuum actuating stem carrying piston is controlled by the other piston.

In testimony that we claim the foregoing as our own, we have hereto affixed our signatures in the presence of two witnesses.

ARTHUR BEHNKE.
JENS C. JENSON.

Witnesses:
C. F. BEHNKE,
C. W. PLOWMAN.